United States Patent
Arpee et al.

(10) Patent No.: US 8,532,024 B2
(45) Date of Patent: Sep. 10, 2013

(54) METHOD AND APPARATUS FOR DETERMINING COUPLED PATH LOSS

(75) Inventors: John Arpee, Herndon, VA (US); John Peter Carlson, Dulles, VA (US)

(73) Assignee: Andrew LLC, Hickory, NC (US)

( * ) Notice: Subject to any disclaimer, the term of this patent is extended or adjusted under 35 U.S.C. 154(b) by 1026 days.

(21) Appl. No.: 11/920,075

(22) PCT Filed: May 17, 2006

(86) PCT No.: PCT/US2006/018931
§ 371 (c)(1),
(2), (4) Date: Sep. 28, 2009

(87) PCT Pub. No.: WO2006/124907
PCT Pub. Date: Nov. 23, 2006

(65) Prior Publication Data
US 2010/0020701 A1    Jan. 28, 2010

Related U.S. Application Data

(60) Provisional application No. 60/681,475, filed on May 17, 2005.

(51) Int. Cl.
H04W 4/00         (2009.01)
H04W 24/00        (2009.01)
H04W 84/04        (2009.01)
H04W 48/20        (2009.01)

(52) U.S. Cl.
CPC ............ *H04W 84/042* (2013.01); *H04W 48/20* (2013.01)
USPC ...................................... 370/328; 455/456.1

(58) Field of Classification Search
USPC ................. 370/232–234, 310, 328; 455/403, 455/404.2, 456.1–456.6
See application file for complete search history.

(56) References Cited

U.S. PATENT DOCUMENTS

| | | | |
|---|---|---|---|
| 3,150,372 A | 9/1964 | Groth, Jr. | |
| 3,659,085 A | 4/1972 | Potter et al. | |
| 4,728,959 A | 3/1988 | Maloney | |

(Continued)

FOREIGN PATENT DOCUMENTS

| | | |
|---|---|---|
| EP | 1 146 760 A2 | 10/2001 |
| EP | 1191804 A2 | 3/2002 |

(Continued)

OTHER PUBLICATIONS

European Patent Office, European Search Report for related European application No. 06784423.3, dated Apr. 18, 2008.

(Continued)

*Primary Examiner* — Paul H Masur
(74) *Attorney, Agent, or Firm* — Duane Morris LLP

(57) ABSTRACT

A method and apparatus is provided for determining coupled path loss in a small geographical which is served by a plurality of transmitters and is subject to broad signal level variation. A method is also provided for determining performance of a signal received by a wireless device located within a bin of a cell of a cellular communication system. The method comprises determining the value of the received signal level as a function of the sum of the signal levels received from a primary base station at a primary cell divided by a number of signal level measurements from the primary base station.

25 Claims, 2 Drawing Sheets

(56) References Cited

U.S. PATENT DOCUMENTS

| | | | |
|---|---|---|---|
| 4,814,751 | A | 3/1989 | Hawkins |
| 4,845,504 | A | 7/1989 | Roberts et al. |
| 4,891,650 | A | 1/1990 | Sheffer |
| 5,056,106 | A | 10/1991 | Wang |
| 5,218,618 | A | 6/1993 | Sagey |
| 5,317,323 | A | 5/1994 | Kennedy et al. |
| 5,327,144 | A | 7/1994 | Stilp et al. |
| 5,365,544 | A | 11/1994 | Schilling |
| 5,372,144 | A | 12/1994 | Mortier et al. |
| 5,404,376 | A | 4/1995 | Dent |
| 5,423,067 | A | 6/1995 | Manabe |
| 5,465,289 | A | 11/1995 | Kennedy |
| 5,497,503 | A | 3/1996 | Rydberg et al. |
| 5,506,863 | A | 4/1996 | Meidan et al. |
| 5,506,864 | A | 4/1996 | Schilling |
| 5,508,708 | A | 4/1996 | Ghosh et al. |
| 5,512,908 | A | 4/1996 | Herrick |
| 5,515,419 | A | 5/1996 | Sheffer |
| 5,519,760 | A | 5/1996 | Borkowski et al. |
| 5,559,864 | A | 9/1996 | Kennedy |
| 5,592,180 | A | 1/1997 | Yokev et al. |
| 5,608,410 | A | 3/1997 | Stilp et al. |
| 5,614,914 | A | 3/1997 | Bolgiano et al. |
| 5,675,344 | A | 10/1997 | Tong et al. |
| 5,736,964 | A | 4/1998 | Ghosh et al. |
| 5,815,538 | A | 9/1998 | Grell et al. |
| 5,825,887 | A | 10/1998 | Lennen |
| 5,862,124 | A | 1/1999 | Hottinen et al. |
| 5,870,029 | A | 2/1999 | Otto et al. |
| 5,920,278 | A | 7/1999 | Tyler et al. |
| 5,926,762 | A | 7/1999 | Arpee et al. |
| 5,952,969 | A | 9/1999 | Hagerman et al. |
| 5,959,580 | A | 9/1999 | Maloney et al. |
| 5,960,341 | A | 9/1999 | LeBlanc et al. |
| 5,973,643 | A | 10/1999 | Hawkes et al. |
| 5,987,329 | A | 11/1999 | Yost |
| 6,014,102 | A | 1/2000 | Mitzlaff et al. |
| 6,047,175 | A | 4/2000 | Trompower |
| 6,047,192 | A | 4/2000 | Maloney |
| 6,049,717 | A | 4/2000 | Dufour et al. |
| 6,091,362 | A | 7/2000 | Stilp |
| 6,097,336 | A | 8/2000 | Stilp |
| 6,097,709 | A | 8/2000 | Kuwabara |
| 6,097,959 | A | 8/2000 | Yost |
| 6,101,178 | A | 8/2000 | Beal |
| 6,108,555 | A | 8/2000 | Maloney et al. |
| 6,108,558 | A | 8/2000 | Vanderspool, II |
| 6,115,599 | A | 9/2000 | Stilp |
| 6,115,605 | A | 9/2000 | Siccardo et al. |
| 6,119,013 | A | 9/2000 | Maloney et al. |
| 6,127,975 | A | 10/2000 | Maloney |
| 6,138,024 | A | 10/2000 | Evans et al. |
| 6,144,711 | A | 11/2000 | Raleigh et al. |
| 6,172,644 | B1 | 1/2001 | Stilp |
| 6,184,829 | B1 | 2/2001 | Stilp |
| 6,188,351 | B1 | 2/2001 | Bloebaum |
| 6,191,738 | B1 | 2/2001 | Pfeil et al. |
| 6,201,499 | B1 | 3/2001 | Hawkes et al. |
| 6,201,803 | B1 | 3/2001 | Munday et al. |
| 6,212,319 | B1 | 4/2001 | Cayrefourcq |
| 6,233,459 | B1 | 5/2001 | Sullivan et al. |
| 6,236,365 | B1 | 5/2001 | LeBlanc et al. |
| 6,243,588 | B1 * | 6/2001 | Koorapaty et al. ........ 455/456.2 |
| 6,246,884 | B1 | 6/2001 | Karmi et al. |
| 6,266,013 | B1 | 7/2001 | Stilp et al. |
| 6,266,514 | B1 * | 7/2001 | O'Donnell ................ 455/67.13 |
| 6,269,246 | B1 | 7/2001 | Rao et al. |
| 6,281,834 | B1 | 8/2001 | Stilp |
| 6,285,321 | B1 | 9/2001 | Stilp et al. |
| 6,288,675 | B1 | 9/2001 | Maloney |
| 6,288,676 | B1 | 9/2001 | Maloney |
| 6,295,455 | B1 | 9/2001 | Fischer et al. |
| 6,311,043 | B1 | 10/2001 | Haardt et al. |
| 6,317,081 | B1 | 11/2001 | Stilp |
| 6,317,604 | B1 | 11/2001 | Kovach, Jr. et al. |
| 6,334,059 | B1 | 12/2001 | Stilp et al. |
| 6,351,235 | B1 | 2/2002 | Stilp |
| 6,363,263 | B1 | 3/2002 | Reudink et al. |
| 6,366,241 | B2 | 4/2002 | Pack |
| 6,388,618 | B1 | 5/2002 | Stilp et al. |
| 6,393,294 | B1 | 5/2002 | Perez-Breva et al. |
| 6,400,320 | B1 | 6/2002 | Stilp et al. |
| 6,407,703 | B1 | 6/2002 | Minter et al. |
| 6,438,380 | B1 * | 8/2002 | Bi et al. ..................... 455/456.1 |
| 6,449,486 | B1 | 9/2002 | Rao |
| 6,463,290 | B1 | 10/2002 | Stilp et al. |
| 6,470,195 | B1 | 10/2002 | Meyer |
| 6,477,161 | B1 | 11/2002 | Hudson |
| 6,483,460 | B2 | 11/2002 | Stilp et al. |
| 6,492,944 | B1 | 12/2002 | Stilp |
| 6,496,701 | B1 * | 12/2002 | Chen et al. ................. 455/456.5 |
| 6,501,955 | B1 | 12/2002 | Durrant et al. |
| 6,519,465 | B2 | 2/2003 | Stilp et al. |
| 6,526,279 | B1 | 2/2003 | Dent |
| 6,546,256 | B1 | 4/2003 | Maloney |
| 6,553,322 | B1 | 4/2003 | Ignagni |
| 6,556,832 | B1 | 4/2003 | Soliman |
| 6,563,460 | B2 | 5/2003 | Stilp et al. |
| 6,571,082 | B1 | 5/2003 | Rahman |
| 6,591,112 | B1 | 7/2003 | Siccardo et al. |
| 6,603,428 | B2 | 8/2003 | Stilp |
| 6,603,761 | B1 | 8/2003 | Wang |
| 6,640,106 | B2 | 10/2003 | Gutowski et al. |
| 6,646,604 | B2 | 11/2003 | Anderson |
| 6,650,905 | B1 * | 11/2003 | Toskala et al. ................ 455/522 |
| 6,661,379 | B2 | 12/2003 | Stilp et al. |
| 6,765,531 | B2 | 7/2004 | Anderson |
| 6,771,625 | B1 | 8/2004 | Beal |
| 6,771,969 | B1 | 8/2004 | Chinoy |
| 6,782,264 | B2 | 8/2004 | Anderson |
| 6,782,265 | B2 | 8/2004 | Perez-Breva et al. |
| 6,834,234 | B2 | 12/2004 | Scherzinger et al. |
| 6,839,539 | B2 | 1/2005 | Durrant et al. |
| 6,845,240 | B2 | 1/2005 | Carlson et al. |
| 6,853,842 | B1 | 2/2005 | Wilson et al. |
| 6,859,172 | B2 | 2/2005 | Powers et al. |
| 6,871,077 | B2 | 3/2005 | Kennedy, Jr. |
| 6,873,290 | B2 | 3/2005 | Anderson et al. |
| 6,876,859 | B2 | 4/2005 | Anderson et al. |
| 6,920,329 | B2 | 7/2005 | Kennedy, Jr. et al. |
| 6,922,170 | B2 | 7/2005 | Alexander, Jr. |
| 6,944,465 | B2 | 9/2005 | Spain et al. |
| 6,952,158 | B2 | 10/2005 | Kennedy, Jr. |
| 6,987,979 | B2 | 1/2006 | Carlsson |
| 6,996,392 | B2 | 2/2006 | Anderson |
| 7,023,383 | B2 | 4/2006 | Stilp et al. |
| 7,116,987 | B2 | 10/2006 | Spain, Jr. et al. |
| 7,167,713 | B2 | 1/2007 | Anderson |
| 7,167,714 | B2 | 1/2007 | Dressler et al. |
| 7,233,799 | B2 | 6/2007 | Spain, Jr. |
| 7,250,907 | B2 | 7/2007 | Krumm et al. |
| 7,257,414 | B2 | 8/2007 | Spain, Jr. et al. |
| 7,271,765 | B2 | 9/2007 | Stilp et al. |
| 7,340,259 | B2 | 3/2008 | Maloney |
| 7,383,051 | B2 | 6/2008 | Spain, Jr. et al. |
| 7,427,952 | B2 | 9/2008 | Bull et al. |
| 7,433,652 | B2 | 10/2008 | Durgin |
| 7,433,695 | B2 | 10/2008 | Gordon et al. |
| 7,440,762 | B2 | 10/2008 | Maloney et al. |
| 7,460,505 | B2 | 12/2008 | Spain |
| 7,593,738 | B2 | 9/2009 | Anderson |
| 7,725,111 | B2 | 5/2010 | Dressler et al. |
| 7,734,298 | B2 | 6/2010 | Bhattacharya et al. |
| 7,753,278 | B2 | 7/2010 | Spain, Jr. et al. |
| 7,796,966 | B2 | 9/2010 | Bhattacharya et al. |
| 7,848,762 | B2 | 12/2010 | Gordon et al. |
| 7,853,267 | B2 * | 12/2010 | Jensen ....................... 455/456.1 |
| 7,899,467 | B2 | 3/2011 | Feuerstein et al. |
| 8,013,785 | B2 | 9/2011 | Bhattacharya et al. |
| 8,068,802 | B2 | 11/2011 | Bhattacharya et al. |
| 8,068,855 | B2 | 11/2011 | Dressler et al. |
| 8,106,817 | B2 | 1/2012 | Bhattacharya et al. |
| 8,106,818 | B2 | 1/2012 | Bhattacharya et al. |
| 8,155,394 | B2 | 4/2012 | Allegra et al. |

| | | | |
|---|---|---|---|
| 2001/0051527 A1* | 12/2001 | Kuwahara et al. | 455/456 |
| 2002/0058503 A1 | 5/2002 | Gutowski | |
| 2002/0127993 A1* | 9/2002 | Zappala | 455/404 |
| 2002/0172223 A1 | 11/2002 | Stilp et al. | |
| 2003/0036409 A1* | 2/2003 | Sato et al. | 455/561 |
| 2003/0064734 A1 | 4/2003 | Stilp et al. | |
| 2003/0129987 A1 | 7/2003 | Tanay et al. | |
| 2003/0139188 A1 | 7/2003 | Chen et al. | |
| 2003/0190919 A1 | 10/2003 | Niemenmaa | |
| 2003/0203738 A1 | 10/2003 | Brown et al. | |
| 2004/0043775 A1 | 3/2004 | Kennedy, Jr. et al. | |
| 2004/0132466 A1 | 7/2004 | Kennedy, Jr. et al. | |
| 2004/0137912 A1 | 7/2004 | Lin | |
| 2004/0198234 A1* | 10/2004 | Wacker et al. | 455/67.13 |
| 2004/0203539 A1 | 10/2004 | Benes et al. | |
| 2004/0203897 A1 | 10/2004 | Rogers | |
| 2004/0203921 A1 | 10/2004 | Bromhead et al. | |
| 2004/0218664 A1 | 11/2004 | Kennedy, Jr. et al. | |
| 2004/0252752 A1 | 12/2004 | Kennedy, Jr. et al. | |
| 2005/0058182 A1 | 3/2005 | Kennedy, Jr. et al. | |
| 2005/0136945 A1 | 6/2005 | Kennedy, Jr. et al. | |
| 2005/0164712 A1 | 7/2005 | Kennedy, Jr. et al. | |
| 2005/0192026 A1 | 9/2005 | Carlson et al. | |
| 2005/0260982 A1* | 11/2005 | Ko et al. | 455/423 |
| 2006/0003695 A1 | 1/2006 | Kennedy, Jr. et al. | |
| 2006/0003775 A1 | 1/2006 | Bull et al. | |
| 2006/0030333 A1 | 2/2006 | Ward et al. | |
| 2006/0116130 A1 | 6/2006 | Kennedy, Jr. et al. | |
| 2006/0125695 A1 | 6/2006 | Kennedy, Jr. et al. | |
| 2006/0141998 A1 | 6/2006 | Kennedy, Jr. et al. | |
| 2006/0154607 A1 | 7/2006 | Kennedy, Jr. et al. | |
| 2006/0240836 A1 | 10/2006 | Kennedy, Jr. et al. | |
| 2006/0258295 A1* | 11/2006 | Wong et al. | 455/67.13 |
| 2007/0087689 A1 | 4/2007 | Kennedy, Jr. et al. | |
| 2007/0111746 A1 | 5/2007 | Anderson et al. | |
| 2007/0155401 A1 | 7/2007 | Ward et al. | |
| 2007/0155489 A1 | 7/2007 | Beckley et al. | |
| 2007/0202885 A1 | 8/2007 | Kennedy, Jr. et al. | |
| 2008/0132244 A1 | 6/2008 | Anderson et al. | |
| 2008/0132247 A1 | 6/2008 | Anderson et al. | |
| 2008/0137524 A1 | 6/2008 | Anderson et al. | |
| 2008/0158059 A1 | 7/2008 | Bull et al. | |
| 2008/0160952 A1 | 7/2008 | Bull et al. | |
| 2008/0160953 A1 | 7/2008 | Mia et al. | |
| 2008/0161015 A1 | 7/2008 | Maloney et al. | |
| 2008/0248811 A1 | 10/2008 | Maloney et al. | |
| 2008/0261611 A1 | 10/2008 | Mia et al. | |
| 2008/0261612 A1 | 10/2008 | Mia et al. | |
| 2008/0261613 A1 | 10/2008 | Anderson et al. | |
| 2008/0261614 A1 | 10/2008 | Mia et al. | |
| 2009/0005061 A1 | 1/2009 | Ward et al. | |

FOREIGN PATENT DOCUMENTS

| | | | |
|---|---|---|---|
| GB | 2311912 A1 | 10/1997 | |
| JP | 06-347529 | 12/1994 | |
| WO | 94/02995 A1 | 2/1994 | |
| WO | 9927737 A1 | 6/1999 | |
| WO | 02/13009 A1 | 2/2002 | |
| WO | 0213439 A2 | 2/2002 | |
| WO | 03001742 A1 | 1/2003 | |
| WO | 2006088472 A1 | 8/2006 | |

OTHER PUBLICATIONS

Y. Zhao, "Standardization of Mobile Phone Positioning for 3G Systems," IEEE Communications Magazine, Jul. 2002, pp. 108-116.
C. Drane, M. MacNaughtan, and C. Scott, "Positioning GSM Telephones," IEEE Communications Magazine, Apr. 1998, pp. 46-54, 59.
J. Caffery, Jr., and G. Stuber, "Overview of Radiolocation in CDMA Cellular Systems," IEEE Communications Magazine, Apr. 1998, pp. 38-45.
T. Rappaport, J.H. Reed and B.D. Woerner, "Position Location Using Wireless Communications on Highways of the Future," IEEE Communications Magazine, Oct. 1996, pp. 33-41.
I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.
L. Mailaender, "On the Geolocation Bounds for Round-Trip Time-of-Arrival and All Non-Line-of-Sight Channels", EURASIP Journal on Advances in Signal Processing, vol. 2008, pp. 1-10.
N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam.pdf, 2004, pp. 1-5.
J.D. Bard, and F.M. Ham, "Time Difference of Arrival Dilution of Precision and Applications," IEEE Transactions on Signal Processing, vol. 47, No. 2, pp. 521-523, Feb. 1999.
K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.
C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.
M. Rahnema, "Overview of the GSM System and Protocol Architecture," IEEE Communications Magazine, Apr. 1993, pp. 92-100.
S. Stein, "Algorithms for Ambiguity Function Processing," IEEE Transactions on Acoustics, Speech, and Signal Processing, vol. ASSP-29, No. 3, Jun. 1981, pp. 588-599.
M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.
M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.
B. Yang, "Projection Approximation Subspace Tracking," IEEE Transactions on Signal Processing, vol. 43, No. 1, Jan. 1995, pp. 95-107.
Amir Leshem, Mati Wax, "Array Calibration in the Presence of Multipath," IEEE Transactions on Signal Processing, vol. 48, No. 1, pp. 53-59, Jan. 2000.
Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.
M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.
R. Schmidt, "Multiple Emitter Location and Signal Parameter Estimation," IEEE Transactions on Antennas and Propagation, vol. AP-34, No. 3, Mar. 1986, pp. 276-280.
Y. Chen, M. Zoltowski, "Joint Angle and Delay Estimation for DS-CDMA with Application to Reduced Dimension Space-Time Rake Receivers," Mar. 1999, pp. 2933-2936.
A.J. Paulraj, C.B. Papadias, "Space-Time Processing for Wireless Communications", IEEE Signal Processing Magazine, vol. 11, Nov. 1997, pp. 49-83.
C.B. Papadias, A.J. Paulraj , "Space-Time Signal Processing for Wireless Communications: A Survey", Information Systems Laboratory, Stanford University.
M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.
Mati-Wax, "Position Location from Sensors with Position Uncertainty," IEEE Transactions Aerospace and Electronic Systems, vol. AES-19, No. 5, Sep. 1983, pp. 658-662.
D.J. Torrieri, "Statistical Theory of Passive Location Systems", IEEE Transactions Aerospace and Electronic Systems, vol. AES-20, No. 2, Mar. 1984, pp. 183-198.
Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

Rick Roberts, "Project: IEEE P802.15 Working Group for Wireless Personal Area Networks (WPANS)," Harris Corporation, Melbourne Florida, Oct. 4, 2004, pp. 1-11.

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

* cited by examiner

METHOD AND APPARATUS FOR DETERMINING COUPLED PATH LOSS

The disclosure claims the filing-date benefit of Provisional Application No. 60/681,475 filed May 17, 2005, the specification of which is incorporated herein in its entirety; the disclosure also relates to application entitled "Method and Apparatus for Determining Path Loss by Combining Geolocation with Interference Suppression" and application entitled "Method and Apparatus for Determining Path Loss by Active Signal Detection filed simultaneously herewith and assigned to the assignee of the instant disclosure, the specification of each of said related application is incorporated herein in its entirety for background information.

BACKGROUND

Signal geo-coding is the process of assigning geographic coordinates to a signal. The signal coordinates can include the geographic coordinate of the transmitter as well as that of the receiver. In many locations there may be an abundance of events within a small area called a bin. A bin may include a multi-story building with a number of subscribers at each floor or it may include some other structure. While some bins can generate a number of events, others may show a lack of activity. If there are many events in a bin, a histogram of signal levels and corresponding path loss data can be constructed. If sufficient data is unavailable for a sector, interpolation techniques can be used from other bins to construct a working model. The model can provide some guidelines in frequency reuse planning and interference avoidance.

Typically there are too few measurements of interference from a sector in the vicinity of the bin to determine an accurate service level. If a sufficient amount of data has been collected, ignoring sector interference may be justified. However, in most cases the system administrator relies on information that only provide average signal level (or path loss) at a bin. The system administrator does not know whether the average values were determined based on a few or many measurements. Moreover, the average values often misrepresent signal propagation characteristics of a bin.

In bins that have an abundance of data, there may be a range of signal levels and interference levels. In these situations relying on average signal level values will prove ineffective as these values do not reflect the true propagation characteristics of the bin. In many instances the signal levels are known to change dramatically within a distance of, for example, ten meters. This is especially true in-building measurements are considered.

Conventional planning tools produce an average estimate of the signal level or path loss value per bin for each sector under consideration. Such measurements ignore a tremendous amount of valuable information about the propagation characteristics within a bin. For example, when power levels or antennas are being optimized to minimize overall network interference it is valuable to maintain paired signal levels or path losses that consider the location of the transmitter and the receiver as well as the signal attributes transmitted therebetween.

Consider a situation where a bin contains a tall building and the serving cell antenna is located some distance away on top of another tall building. At street level and in the lower levels of the building the serving signal level and the interfering signal level may both be low. On the upper levels of the building the interfering signal levels may increase as would the serving signal level. Relying on an average signal level for the entire building will dilute this valuable information. Using the average serving and interfering signal levels grossly undermines the true propagation characteristics of the bin and leads to a substantial over-estimate of the severity of the interference.

On the other hand, in a situation where a serving cell antenna is located nearby on the tall building on a two- or three-story building, the serving cell may be substantially stronger and interference substantially weaker for the lower levels of the building. For the higher levels of the tall building, the serving level may be lower but the interference level may be higher. In this case, the serving and the interfering signal levels would be negatively correlated. Again, an average serving signal level, interference or path loss calculation will not provide sufficient detail of the propagation characteristics. Therefore, there is a need for obtaining propagation information which accurately couples signal levels at different locations within a bin with the serving base stations that provide the signal at said locations.

SUMMARY

In one embodiment, the disclosure relates to an improved method for assigning a value for an attribute of a signal received by a wireless device located in a bin in a cell of a cellular communication system. Whereas conventionally the value is determined as a function of an average value of the attribute of a first plurality of signals received from a second plurality of base stations, in one embodiment the improvement comprises assigning the value as a function of an average value of the attribute of a third plurality of signals from one of the second plurality of base stations.

In another embodiment, the disclosure relates to a method for determining a value for an attribute of a signal received by a wireless device located in a bin in a cell of a cellular communication system comprising the steps of: (a) receiving a first plurality of signals from a first plurality of base stations; (b) measuring a first attribute of the first plurality of signals; (c) determining a primary base station from the first plurality of base stations as a function of the measured first attributes of the first plurality of signals; (d) receiving a second plurality of signals from the primary base station; (e) measuring a second attribute of the second plurality of signals; and (f) determining a value for the second attribute for the wireless device as a function of the measured attributes of the second plurality of signals.

In still another embodiment, the disclosure relates to a system for determining a value for an attribute of a signal received by a wireless device located in a bin in a cell of a cellular communication system comprising the wireless device having a receiver for receiving a first plurality of signals from a first plurality of base stations; measuring circuitry for measuring a first attribute of the first plurality of signals; circuitry including a microprocessor for determining a primary base station from the first plurality of base stations as a function of the measured first attributes of the first plurality of signals; said receiver for receiving a second plurality of signals from the primary base station; said measuring circuitry for measuring a second attribute of the second plurality of signals; and said circuitry including a microprocessor for determining a value for the second attribute for the wireless device as a function of the measured attributes of the second plurality of signals.

BRIEF DESCRIPTION OF THE DRAWINGS

The embodiments of the disclosures are described in relation with the following exemplary and non-limiting embodiments, in which.

DETAILED DESCRIPTION

Figure 1:
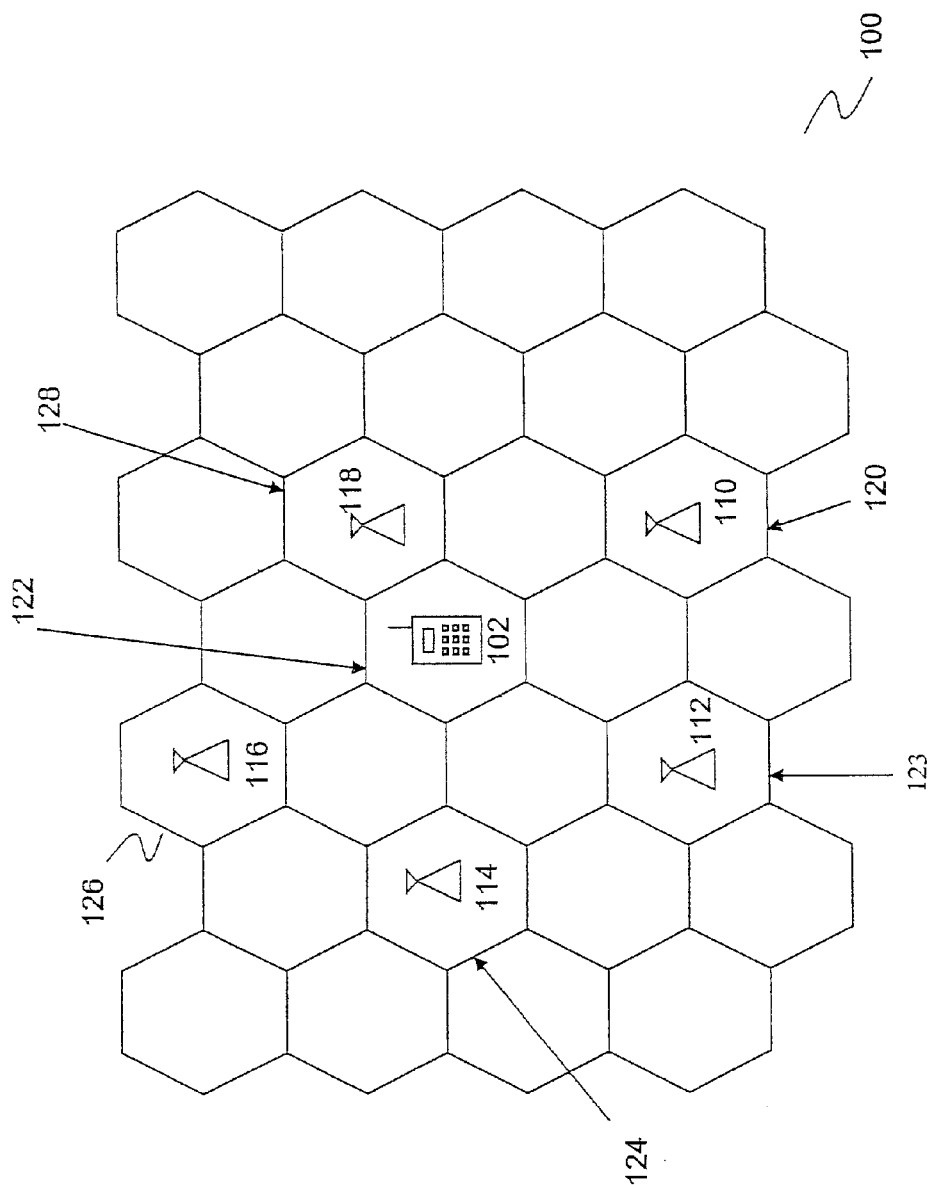
FIG. 1 is a schematic representation of a conventional cellular communication system implementing one embodiment of the disclosure.

FIG. 1 is a schematic representation of a conventional cellular communication system implementing one embodiment of the disclosure. FIG. 1 shows cellular communication system 100, divided into several cells. Conventionally, a cellular communication system defines a cell as a six-side polygon. According to the conventional frequency reuse concept, a single high-power transmitter (for a large area) is replaced by multiple low-power transmitters, each covering only a small portion of the larger area. In this scheme, each base station transmitter is allocated a number of frequency channels from the total number of available channels. To avoid interference, neighboring base stations are assigned different groups of channels.

Referring once again to FIG. 1, wireless device 102 is located in a bin in cell 122. The wireless device may be one or more of: wireless transmitter, radio frequency transmitter, mobile telephone, cellular phone, text messaging device, portable computer, laptop computer, personal digital assistant, vehicle security device, vehicle tracking device, pager, base station and wireless location sensor. The wireless device 102 may be referred to herein as a receiver.

The wireless device 102 receives signals from each of the base stations 110, 112, 114, 116 and 118, respectively located at cells 120, 123, 124, 126 and 128. Because of the intangibles associated with all wireless radio communications, certain received signals may be stronger at the location of the wireless device 102 than others. For example, at street level wireless device 102 may receive its strongest signal from base station 118. In contrast, if the wireless device is positioned on a roof-top of a tall building in cell 122, the strongest signal level may come from base station 114 which has a clear line of sight to wireless device 102. When applied to a bin, the signal level can vary depending on the location where the signal is received in the bin. That is, while all base stations transmit the same signal on the same communication channel, the strongest signal received by the wireless device 102 can vary depending on the exact location and the altitude of the wireless device. When the bin includes a building or a large structure in a metropolitan area, the variation can affect network performance drastically. Any information which couples received signal strength with a location within the bin is useful in frequency reuse planning and network administration.

Figure 2:
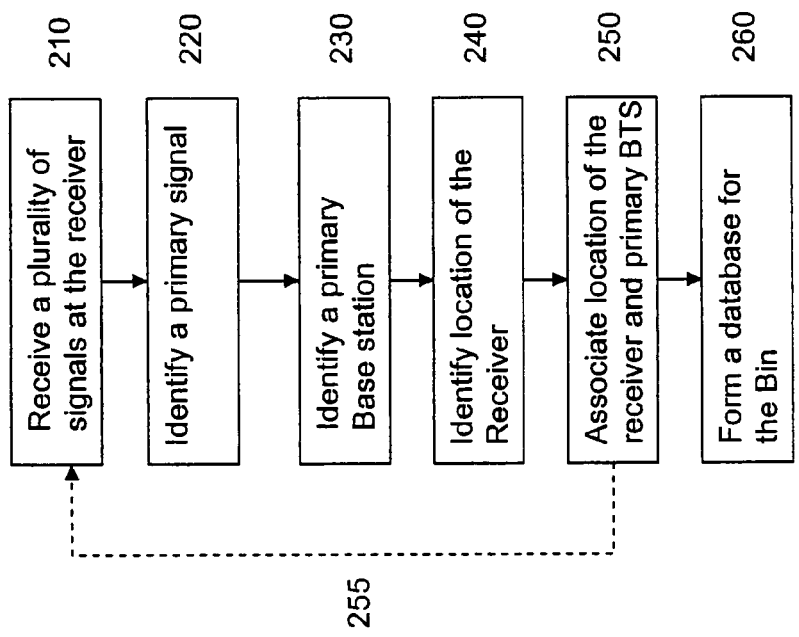
FIG. 2 is a flow chart depicting an exemplary method according to one embodiment of the disclosure.

FIG. 2 shows an exemplary method according to one embodiment of the disclosure. The exemplary method outlined in FIG. 2 is particularly suitable for obtaining signal propagation data for a receiver located in a bin of a cellular communication system. In step 210, the receiver receives a plurality of signals from several base stations. This information can be received and processed in a relatively short period of time such that it would be reasonable to assume that the mobile terminal has not moved significantly.

The quality of the received signals from the several base stations is usually not consistent and typically the signal from one base station stands out as providing the highest comparative quality. Signal quality can be measured as a function of signal level or as a function of other signal attributes. Signal attributes may include signal-to-noise ratio, signal-to-interference ratio, inter-symbol interference, bit error rate, carrier-to-interference ratio or other similar quantifiable indicia known in the art. In step 220, the receiver identifies the primary signal. Optionally, the receiver can identify the source of the primary signal as the primary base station. In another embodiment, the receiver reports an attribute of the received signals to a central node or to an auxiliary device tasked with monitoring signal propagation in the bin.

Once a primary signal is selected, in step 230, the receiver (or the central node) identifies the primary base station associated with the primary signal. In one embodiment, the primary base station is the base station which transmits the primary signal. The primary base station can also be a relay station configured to amplify and relay a weaker signal received from another transmitter. In addition to identifying the primary base station, the cell and the sector housing said base station may also be identified. This identification can provide additional propagation data.

In step 240, the receiver's location is identified. This step can be implemented by using any of the conventional geo-location methods. For example, the receiver can be equipped with a geo-positioning system ("GPS") or it can use a wireless location sensor executing conventional methods such as time-difference of arrival ("TDOA") or angle of arrival ("AOA") information, or some combination, to determine the location of the receiver. For an embodiment where the receiver is located in a bin, the latitude and longitude may not vary as much as the altitude. In any event, the receiver's location can be determined independently of the bin, for example, by latitude, longitude and altitude, or it can be determined in relation to the bin (i.e., at altitude of 200 meters at a given bin location).

In step 250, the location of the receiver and the primary base station serving the receiver at said location may be paired together to provide data points. The data points may additionally include such information as the serving cell's ID, the base station's ID, the received signal level and/or other signal attributes. Secondary information including path loss value between the primary base station and the receiver's location may also be calculated and compiled. Steps 210-250 can be repeated for a number of different receiver locations throughout the bin in order to provide, for example, an accurate understanding of the number of base stations serving different locations of the bin (see step 255). In step 260, a database is formed with the compiled data. The database can be used to study and modify the frequency reuse plan. Importantly, these steps can be implemented within the existing communication infrastructure and do not require additional network overlay or expansion.

For example, the collected information can be used to build a multivariate histogram of the signal levels or path loss values between the primary base station and the wireless device. This information can also be used to produce interference analyses that are more accurate than the conventional methods which only compare average measurements of each sector. Additionally, the same information can be expanded to take into account the speed and direction of the receiver as it moves through the bin.

The steps outlined in the exemplary embodiment of FIG. 2 can be used to determine a primary base station for the entire bin. According to this embodiment, a representative database can be compiled based on the signal propagation characteristics of the primary base station at one or more locations throughout the bin.

In an alternative embodiment where different locations throughout the bin identify different base stations as the primary base stations, the principles disclosed herein can be applied to each primary base station to obtain signal propagation characteristics specific to each location. For example, referring to FIG. 1, wireless device 102 may receive its strongest signal from base station 118 if the wireless device is at the first floor of the building. On the other hand, wireless device 102 may receive its strongest signal from base station 114 if the wireless device is positioned on a roof-top of the same building. Wireless device 102 may additionally receive its strongest signal from base station 116 if the wireless device is at the mid-building level and at a southeast corner of the building. Applying the principles of FIG. 2 to this scenario, a database can be constructed for each of the three locations. Thus, a primary base station can be identified at each location of the building, signal attributes for each location can be determined as a function of the primary base station serving that particular location and the propagation characteristics of each location can be compiled to form a database.

A system according to one embodiment of the disclosure may include a plurality of transmitters or base stations communicating with one or more receivers located within a bin within the communication system. The receiver can be a wireless transmitter, a mobile telephone, a cellular phone, a text messaging device, a portable computer, a laptop computer, a personal digital assistant, a vehicle security device, a vehicle tracking device, a pager, a base station or a wireless location sensor.

The base stations may be located at different locations from each other and from the receiver. The base stations can transmit a signal to the receiver on the same communication channel, however because of structural and environmental obstacles, for example, the received signal levels at the receiver may vary. The receiver may identify the signal with the most favorable signal attributes from among the received signals. The identification step can be implemented by the receiver or by an auxiliary circuitry in communication with the receiver. The circuitry can include one or more microprocessors. Once the signal with the most favorable attributes (i.e., the primary signal) has been identified, the system (e.g., the receiver or an auxiliary circuit) can identify the source of the signal as the primary base station. In the event that the signal is received from a repeater or a relay station, the primary base station can be the repeater or the relay station. The source can be identified by, for example, base station number, cell and/or sector location.

The system may also include a geo-location device for determining the exact location of the receiver. For example, the receiver may include GPS capabilities that can determine its location simultaneously with receiving and identifying the primary signal. In an alternative embodiment, the system may include a wireless location sensor ("WLS") overlay configured to detect the location of the receiver based on conventional methods of TDOA and AOA.

Finally, the system may include one or more memory modules for receiving and storing information identifying signal strength or signal attributes, location of the receiver and the identity of the primary base station. The memory modules can be co-located with the receiver or they can be implemented at an auxiliary circuit. In an alternative embodiment, the receiver selects the primary base station and reports pertinent signal information to a central node which will then compile a database for the bin. As the number of measurements increase, the database can provide valuable information to the service provider.

According to another embodiment of the disclosure, the receiver reports either the signals or their attributes to a central node, allowing the central node to identify the primary signal and the primary base station. Once identified, the central node communicates the identity of the primary base station to the receiver. The receiver can then monitor the primary signals received from the primary base station and report the appropriate signal information to the central node.

While the exemplary embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. In a method for determining a value for an attribute of a signal received by a wireless device located in a bin in a cell of a cellular communication system wherein said value is determined as a function of an average value of the attribute of a first plurality of signals received from a plurality of base stations, wherein the first plurality of signals are received in the wireless device at a location in said bin, the improvement comprising:
    associating one of the plurality of base stations to said location in said bin; and
    determining the value as a function of an average value of the attribute of a second plurality of signals from said one of the plurality of base stations without drive testing.

2. The method of claim 1 wherein the wireless device is selected from the group consisting of: wireless transceiver, radio frequency transceiver, mobile telephone, cellular phone, text messaging device, portable computer, laptop computer, personal digital assistant, vehicle security device, vehicle tracking device, and pager.

3. The method of claim 1 wherein the attribute is selected from the group consisting of: signal level, signal-to-noise ratio, signal-to-interference ratio, inter-symbol interference, bit error rate, and carrier-to-interference ratio.

4. The method of claim 1 wherein the first plurality of signals does not equal the second plurality of signals.

5. A method for determining a value for an attribute of a signal received by a wireless device located in a bin in a cell of a cellular communication system comprising the steps of:
    (a) receiving a first plurality of signals from a first plurality of base stations, wherein said first plurality of signals are received in said wireless device at a location in said bin;
    (b) measuring a first attribute of the first plurality of signals;
    (c) determining a primary base station from the first plurality of base stations as a function of the measured first attributes of the first plurality of signals and associating said primary base station to said location in said bin;
    (d) receiving a second plurality of signals from the primary base station;
    (e) measuring a second attribute of the second plurality of signals; and
    (f) determining a value for the second attribute for the wireless device as a function of the measured attributes of the second plurality of signals,
    wherein each of the steps are performed without drive testing, and
    wherein the determined base station and value are used for obtaining signal propagation data for the wireless device in the system.

6. The method of claim 5 wherein the wireless device is selected from the group consisting of: wireless transceiver, radio frequency transceiver, mobile telephone, cellular phone, text messaging device, portable computer, laptop computer, personal digital assistant, vehicle security device, vehicle tracking device, and pager.

7. The method of claim 5 wherein the first and second attributes are each selected from the group consisting of: signal level, signal-to-noise ratio, signal-to-interference ratio, inter-symbol interference, bit error rate, and carrier-to-interference ratio.

8. The method of claim 5 further comprising the steps of:
(g) geolocating the wireless device;
(h) collecting data representative of the location of the wireless device, the value of the second attribute at the location of the wireless device, and an identity of the primary base station; and
(i) storing the collected data in a database.

9. The method of claim 8 wherein the data collected further includes data representative of an identity of the cell in which the primary base station is located, and an identity of a sector of the primary base station from which the second plurality of signals is received by the wireless device.

10. The method of claim 8 wherein the geolocating of the wireless device includes determining at least two of a latitude, a longitude, and an altitude of the wireless device.

11. The method of claim 5 wherein the bin defines an area of the cell of the cellular communication system and wherein the bin includes a multilevel structure.

12. The method of claim 11 wherein steps (a) through (f) are repeated for a third plurality wireless devices each located in the bin and each located on a different level of the multilevel structure.

13. The method of claim 5 further comprising the step of determining a path loss between the primary base station and the wireless device.

14. The method of claim 5 further comprising the steps of:
(g) geolocating the wireless device;
(h) determining a frequency use plan for the cellular communication system; and
(i) altering the frequency use plan as a function of the geolocation of the wireless device.

15. The method of claim 5, wherein the first and second attributes are the same attribute.

16. A system for determining a value for an attribute of a signal received by a wireless device located in a bin in a cell of a cellular communication system comprising:
a receiver for receiving a first plurality of signals at a location in said bin from a first plurality of base stations;
measuring circuitry for measuring a first attribute of the first plurality of signals;
circuitry including a microprocessor for determining a primary base station from the first plurality of base stations as a function of the measured first attributes of the first plurality of signals in association to said location in said bin;
a receiver for receiving a second plurality of signals from the primary base station;
measuring circuitry for measuring a second attribute of the second plurality of signals;
circuitry including a microprocessor for determining a value for the second attribute for the wireless device as a function of the measured attributes of the second plurality of signals,
wherein each of said receivers, measuring circuitry and microprocessors are either contained in the wireless device which is in active communications with said system or are non-mobile signal data collection equipment, and
wherein the determined base station and value are used for obtaining signal propagation data for the wireless device in the system.

17. The system of claim 16 wherein the wireless device is selected from the group consisting of: wireless transceiver, radio frequency transceiver, mobile telephone, cellular phone, text messaging device, portable computer, laptop computer, personal digital assistant, vehicle security device, vehicle tracking device, and pager.

18. The system of claim 16 wherein the first and second attributes are each selected from the group consisting of: signal level, signal-to-noise ratio, signal-to-interference ratio, inter-symbol interference, bit error rate, and carrier-to-interference ratio.

19. The system of claim 18 wherein the first and second attributes are the same.

20. The system of claim 16 further comprising:
circuitry for geolocating the wireless device;
circuitry for collecting data representative of the location of the wireless device, the value of the second attribute at the location of the wireless device, and an identity of the primary base station; and
a database for storing the collected data.

21. The system of claim 20 wherein the data collected further includes data representative of an identity of the cell in which the primary base station is located, and an identity of a sector of the primary base station from which the second plurality of signals is received by the wireless device.

22. The system of claim 20 wherein the circuitry for geolocating the wireless device includes circuitry for determining at least two of a latitude, a longitude, and an altitude of the wireless device.

23. The system of claim 16 wherein the bin defines an area of the cell of the cellular communication system and wherein the bin includes a multilevel structure.

24. The system of claim 16 further comprising circuitry for determining a path loss between the primary base station and the wireless device.

25. The system of claim 16 further comprising:
circuitry for geolocating the wireless device;
a database including information for a frequency use plan for the cellular communication system; and
circuitry for altering the frequency use plan as a function of the geolocation of the wireless device.

* * * * *